United States Patent
Su

(10) Patent No.: US 12,438,913 B2
(45) Date of Patent: Oct. 7, 2025

(54) PROVISIONING ENCRYPTED DOMAIN NAME SERVICE AND SECURE VALUE-ADDED SERVICE WITH CERTIFICATES AT A CUSTOMER PREMISE EQUIPMENT IN A BROADBAND SATELLITE SYSTEM

(71) Applicant: Hughes Network Systems, LLC, Germantown, MD (US)

(72) Inventor: Chi-Jiun Su, Rockville, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 71 days.

(21) Appl. No.: 18/498,711

(22) Filed: Oct. 31, 2023

(65) Prior Publication Data

US 2024/0064173 A1 Feb. 22, 2024

Related U.S. Application Data

(63) Continuation of application No. 17/552,785, filed on Dec. 16, 2021, now Pat. No. 11,843,635.

(60) Provisional application No. 63/255,046, filed on Oct. 13, 2021.

(51) Int. Cl.
  *H04L 29/06* (2006.01)
  *H04L 9/32* (2006.01)
  *H04L 9/40* (2022.01)

(52) U.S. Cl.
  CPC .......... *H04L 63/166* (2013.01); *H04L 9/3268* (2013.01); *H04L 63/0485* (2013.01); *G06Q 2220/00* (2013.01)

(58) Field of Classification Search
  None
  See application file for complete search history.

(56) References Cited

U.S. PATENT DOCUMENTS

| 2017/0093802 | A1* | 3/2017 | Norum | H04L 63/0428 |
| 2021/0250349 | A1* | 8/2021 | Konda | H04L 63/083 |
| 2021/0266185 | A1* | 8/2021 | Konda | H04L 61/4511 |
| 2022/0239696 | A1* | 7/2022 | Konda | H04L 61/4511 |

* cited by examiner

*Primary Examiner* — Bradley W Holder
(74) *Attorney, Agent, or Firm* — NovoTechIP International PLLC

(57) ABSTRACT

A satellite communication system which supports encrypted DNS at the customer premise equipment terminal to provide the benefits of local DNS caching. Some implementations use Certificate Authority (CA)-signed Transport Layer Security (TLS) certificates. Implementations may provide encrypted DNS service at the CPE, where the system installs CA-signed TLS certificate at the customer premise equipment (CPE) terminal. The same certificate can be used at multiple terminals using a wild-card certificate distributed by the satellite to provide value added services at a CPE as secure web services to off-the-shelf web clients and applications.

20 Claims, 10 Drawing Sheets

| FQDN/Hostname | Private IP Address |
|---|---|
| CPE Hostname | w1.x1.y1.z1 |
| FQDN for DoH | w1.x1.y1.z1 |
| FQDN for Service#1 | w1.x1.y1.z1 |
| ⋮ | |
| FQDN for Service#N | w1.x1.y1.z1 |

PROVISIONING ENCRYPTED DOMAIN NAME SERVICE AND SECURE VALUE-ADDED SERVICE WITH CERTIFICATES AT A CUSTOMER PREMISE EQUIPMENT IN A BROADBAND SATELLITE SYSTEM

BACKGROUND

User's and internet browsers use fully qualified domain names (FQDN) to access resources on the internet. An FQDN is a language name representation that identifies a specific computer or internet host on the internet. A domain name service (DNS) translates a FQDN into an internet protocol (IP) address. For example, www.google.com is translated into an IP version 4 address of "172.253.122.99" or IP version 6 address of "2001:4860:4802:32::75". The FQDN consists of two parts: the host name and the domain name. In this example the host name and the domain name are "www" and "google.com" respectively. A DNS lookup is needed at the beginning of virtually every connection for a client to send an Internet Protocol (IP) packet to access internet resources.

In some systems, such as a satellite system, a DNS cache is maintained to store DNS responses when a DNS forwarder located at a satellite terminal receives the responses. DNS responses can also be preloaded and stored in the DNS cache of the terminal in advance. When DNS queries from a client arrive at the customer premises equipment (CPE) satellite terminal, they can be served locally and round-trip time over a satellite link can be saved. Consequently, response time of the application/browser can be minimized to improve user's Quality of Experience (QoE) of the application and web browsing. In addition, using a DNS cache reduces the number of DNS queries transmitted over the satellite and saves valuable satellite system radio resources.

Using encrypted DNS is becoming more common. Evolution to encrypted DNS is intended for privacy and security but creates problems in existing solutions for performance, security and efficient use of system resources. Historically, DNS traffic was unencrypted allowing DNS filtering to be used for enterprise firewall, parental control, malware protection, blocking botnet command-and-control, content blocking and etc. Encrypted DNS creates a problem where some security measures such as those above can no longer function without being able to identify the DNS information. Furthermore, DNS caching is no longer feasible where the domain name is encrypted. As a result, the user's quality of experience (QoE) will be degraded and scarce satellite radio resources will be used for encrypted DNS traffic. Hence there is a need for overcoming the problems of using encrypted DNS.

SUMMARY

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

An example implementation provides a customer premise equipment (CPE) terminal including: a processor with a memory, where the memory stores instructions that when executed cause the processor to perform the functions of: providing internet services to a client device at a customer premise through a satellite connected to a satellite gateway by: receiving a signed certificate from a certificate server connected to the satellite gateway, assigning a private internet protocol (IP) address to the client device in a local area network, and providing encrypted domain name server (DNS) services to the client device using the signed certificate and the private IP address.

An example implementation provides a customer premise equipment (CPE) terminal including: a processor with a memory, where the memory stores instructions that when executed cause the processor to perform the functions of: providing internet services to a plurality of client devices at a customer premise through a satellite connected to a satellite gateway by: receiving a TLS, signed wildcard certificate from a certificate server connected to the satellite gateway, assigning a private internet protocol (IP) address to the plurality of client devices in a local area network, and providing encrypted domain name server (DNS) services to the plurality of client devices using the TLS, signed wildcard certificate and the private IP address.

An example implementation method for communicating on a communication system includes: obtaining from a certificate authority (CA) a CA signed certificate at a certificate server; distributing via a satellite the CA signed certificate to at least one CPE terminal at a customer premise that provides internet services to a client device; and provisioning workflow at the CPE terminal by: receiving the certificate and installing it in a secure place in the CPE; setting up new encrypted DNS services using proper fully qualified domain name (FQDN) corresponding to the certificate; setting up secure value-added services using proper FQDN corresponding to the certificate; configuring local split-DNS setup for FQDNs of encrypted DNS and secure web services; configuring encrypted DNS discovery protocol to use the encrypted DNS services at the CPE; and invoking value-added services at a client device via standard protocol.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
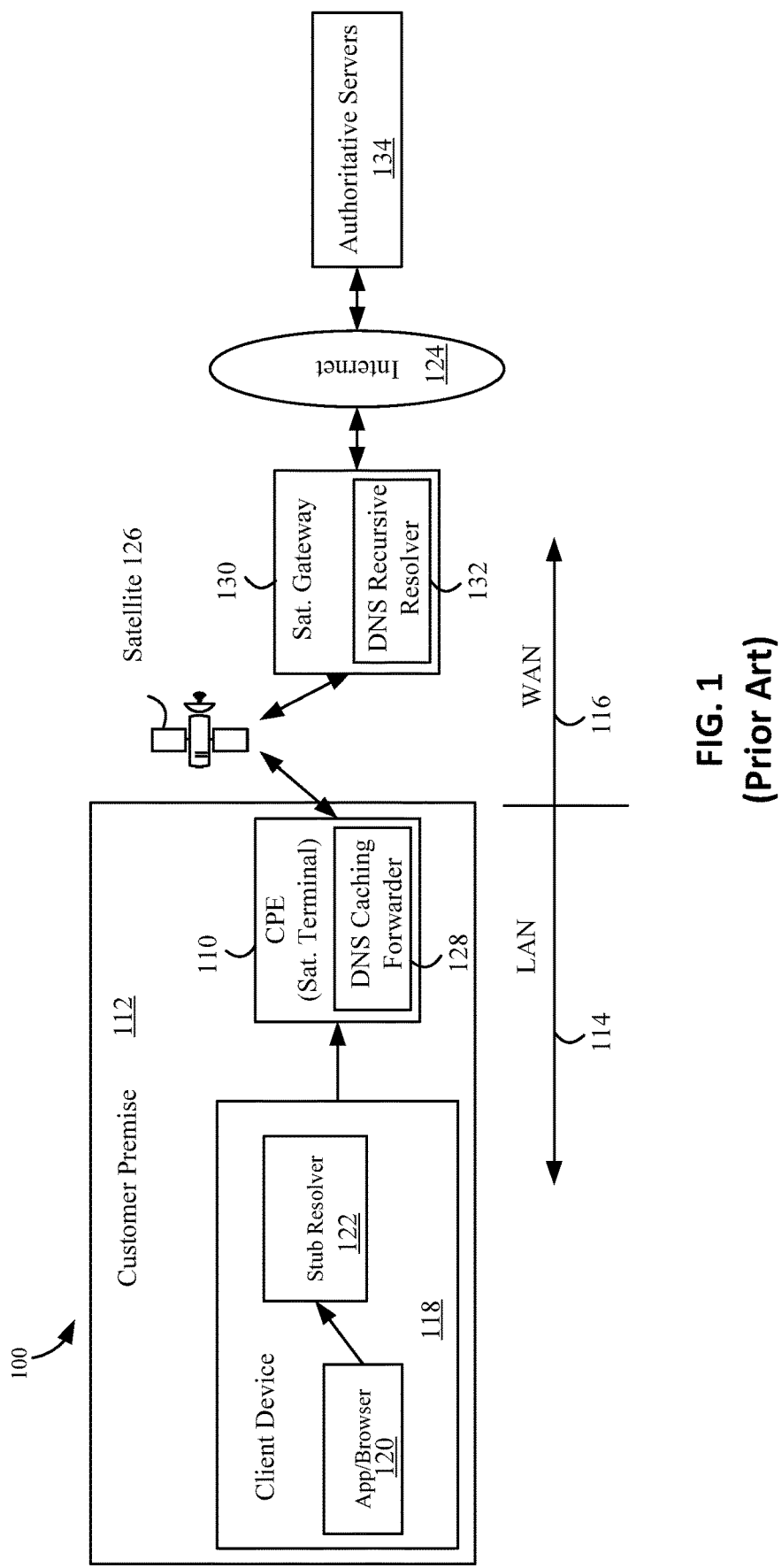
FIG. 1 illustrates a satellite system configured to provision an unencrypted DNS service at a CPE according to the prior art.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

Implementations described herein overcome problems created by encrypted DNS. Example implementations enable provisioning of encrypted DNS at the CPE and restore the benefits of local DNS caching. Some implementations of the described system and method may use Certificate Authority (CA)-signed Transport Layer Security (TLS) certificates instead of self-signed certificates commonly used in the prior art. Moreover, implementations described herein allow use of off-the-shelf browsers and web service applications without modification as well as without generating any security warning. In addition to providing encrypted DNS service at the CPE, where the system installs CA-signed TLS certificate at the customer premise equipment (CPE), the same certificate can be used to provide value added services at a CPE as secure web services to off-the-shelf web clients and applications. Services can be provided using light weight virtualization inside a CPE which allows agile flexible deployment, update and decommissioning from a cloud-based server. All services which requires TLS-security can make use of the same certificate deployed at the CPE. Value added services can be supplied as described in U.S. Patent Application 2021/0227046.

Described implementations herein provide the ability to perform scalable deployment of encrypted DNS services in a large number of CPEs with private IP addresses. Further, implementations provide a system and method to provision encrypted DNS (Domain Name Service) and secure web services at a CPE (Customer Premise Equipment) using CA-signed certificates in a satellite broadband network: Automated CA-signed TLS certificate acquisition, deployment and management in a satellite environment, Provisioning encrypted DNS services at a CPE using CA-signed TLS certificate, Provisioning secure value-added web services at a CPE using CA-signed TLS certificate.

Implementations described herein provision CA certificates in contrast to self-signed certificates commonly used in prior systems. The encrypted DNS service and secure web services are deployed at a CPE with private IP addresses. The described implementations use a Fully Qualified Domain Name (FQDN) which is valid in a local environment of a CPE. Described implementations also provide scalable practical management of certificate deployment to a system with millions of CPEs by making use of inherent availability of broadcast medium in a satellite system. Implementations may be used in consumer and enterprise satellite systems with LEO, MEO and GEO satellites as well as terrestrial systems.

Implementations described herein enable provisioning of encrypted DNS at the CPE and supports the benefits of a local DNS caching forwarder. Implementations of the described system and method use CA-signed TLS certificates instead of self-signed certificates often used in the prior art. Moreover, off-the-shelf browsers and application work without any modification as well as without any security warning. Since the TLS certificate is CA signed, trusted root certificates in the operating system of the client devices can be used to verify the certificate.

In addition to providing encrypted DNS service at the CPE, where the system installs CA-signed TLS certificate at the CPE, the same certificate can be used to provide value added services at a CPE as secure web services to off-the-shelf web clients and applications.

In implementations herein, the system enables acquiring CA-signed certificates in an automated way, deploying them to a large number of CPEs in an efficient operation and management, and providing encrypted DNS services and secure web services at CPEs with local FQDNs and private IP addresses.

Transport layer security (TLS) certificates in Web Public Key Infrastructure (PKI) are used to authenticate domain names including fully qualified domain names (FQDN). There are different types of certificates issued by a certificate authority (CA). Domain Validation (DV) certificates are the most common type of TLS certificate. The only validation the CA is required to perform to issue a DV certificate is to verify that the requester has effective control of the FQDN. Automatic Certificate Management Environment (ACME), an IETF standard, RFC 8555, can be used to automate the process of verification and certificate issuance of DV certificates. "Let's Encrypt" is a nonprofit CA providing TLS certificates, and it is "free, automated, open source, transparent, and cooperative". Obtaining a DV certificate typically requires a valid FQDN managed by a DNS hosting service, where the DNS hosting service runs DNS name servers to provide the IP addresses corresponding to the FQDN, and a web server with a public IP address corresponding the FQDN globally reachable from the Internet.

FIG. 1 illustrates a satellite system configured to provision an unencrypted DNS service at a CPE according to the prior art. FIG. 1 represents a typical prior art satellite system 100 using DNS for customer premise equipment (CPE) 110 located at a customer premise 112. The system 100 usually is divided into two network portions as shown in FIG. 1, namely a local area network (LAN) 114 and wide area network (WAN) interface 116. The system 100 may include one or more client devices 118. The client devices 118 includes an application or browser 120 and a stub resolver 122 as described further below. The client device 118 resides at the LAN interface side where private IP addresses are assigned to them by the CPE 110 which may also be referred to as a satellite terminal. One or more public IP addresses are assigned on the WAN interface side of the CPE by an Internet Service Provider (ISP) (not shown) accessed through the internet 124 over the satellite 126.

The CPE 110 performs Network Address Translation (NAT) to map private IP addresses of client's devices in the LAN interface side of the CPE to one or a few public IP addresses of the CPE in the WAN interface side for communication between client devices in the LAN and Internet servers. Public IP addresses are globally unique on the Internet and are assigned by Internet Registries. Private IP addresses are unique locally in the LAN and are usually assigned by the CPE 110 to the client devices 118 attached to it. Public IP addresses are required to communicate with a computer over the Internet 124 while private IP addresses are used to communicate among the devices in the same LAN. The CPE 110 usually hosts a DNS caching forwarder 128. The forwarder 128 not only converts global FQDNs to public IP addresses but also translates local hostnames/ domain names/FQDNs to local private IP address.

As described above, DNS translates a FQDN into an IP address. A DNS lookup is needed at the beginning of virtually every connection for a client to send an IP packet. As shown in FIG. 1, an application or browser 120 asks for the IP address corresponding to a FQDN from a stub resolver 122, residing in a client device 118. The stub resolver 122 checks its cache for the answer. If the answer is not in its cache, it issues a query to a DNS recursive resolver 132. Usually there exists a DNS caching forwarder at a CPE 110. The caching forwarder 128 check if DNS response for the query is in its cache or not. If it is, the response is returned to the stub resolver 122 immediately. If it is not, it will forward the query to the DNS recursive resolver 132. In this example, the DNS recursive resolver 132 is in the satellite gateway 130. The DNS recursive resolver 132 may also be hosted by another party and located across the Internet 124. The DNS recursive resolver 132 checks if its cache stores the answer for the query or not. If it does, the response is returned immediately. If it does not, it will send the query to a series of authoritative servers 134 recursively. How long a DNS response can be cached is determined by a Time-To-Live (TTL) value in a response.

A DNS cache is typically maintained at a satellite terminal to store DNS responses when the DNS forwarder receives the responses. In the example described below, the DNS cache is part of the DNS caching forwarder 226 in FIG. 2. DNS responses can also be preloaded and stored in the DNS cache of the terminal in advance. When DNS queries from a client arrive at the CPE satellite terminal 210, they can be served locally and round-trip time over a satellite link can be saved. Consequently, response time of the APP/browser 246 can be minimized to improve user's Quality of Experience (QoE) of the applications and web browsing. Moreover, DNS cache reduces the number of DNS queries transmitted over the satellite and saves valuable satellite system radio resources.

DNS Security Extensions (DNSSEC) provide origin authentication and data integrity but not confidentiality. Recently, several encrypted DNS technologies have emerged for the primary purpose of providing user privacy. They are the IETF standards, DNS over Transport Layer Security (DoT) and DNS Queries over HTTPS (DoH)]. DNS over QUIC (DoQ) work is still being standardized.

Certificates authorities are prevented from issuing TLS certificates to local FQDNs with private addresses. Current practice uses self-signed certificates for local FQDNs with private addresses. Self-signed certificates are not issued by legitimate certificate authorities and they are not CA-signed. Installing self-signed CA certificates in Trusted Root Certification Authorities Certificate Store in client's devices is typically required to make the client device work without security warning by applications and browsers. Unless client devices are issued/managed by an enterprise IT department, it is not easy to install self-signed CA certificates in client's devices. Using self-signed CA certificates often requires users to ignore security warning which makes the users vulnerable to malware and other threats. The use of self-signed certificates increases the attack surface of the hackers and increases security risks. In the examples described herein, the certificate server acquires CA-signed wildcard certificates from a certificate authority in an automated way and deploys them to a large number of CPEs efficiently through a satellite broadcast. Wildcard certificates allows the use of local FQDNs with different subdomains at different CPEs. Encrypted DNS service and secure web services are hosted at the private IP address of the CPE. Local split-DNS setup configures the local FQDNs of the services with private IP address of the CPE in the local DNS table of the DNS forwarder at the CPE. When a client's device asks for DNS lookup of the FQDN for these services, the queries for the FQDNs are answered by the CPE with the private IP address of the CPE.

Figure 2:
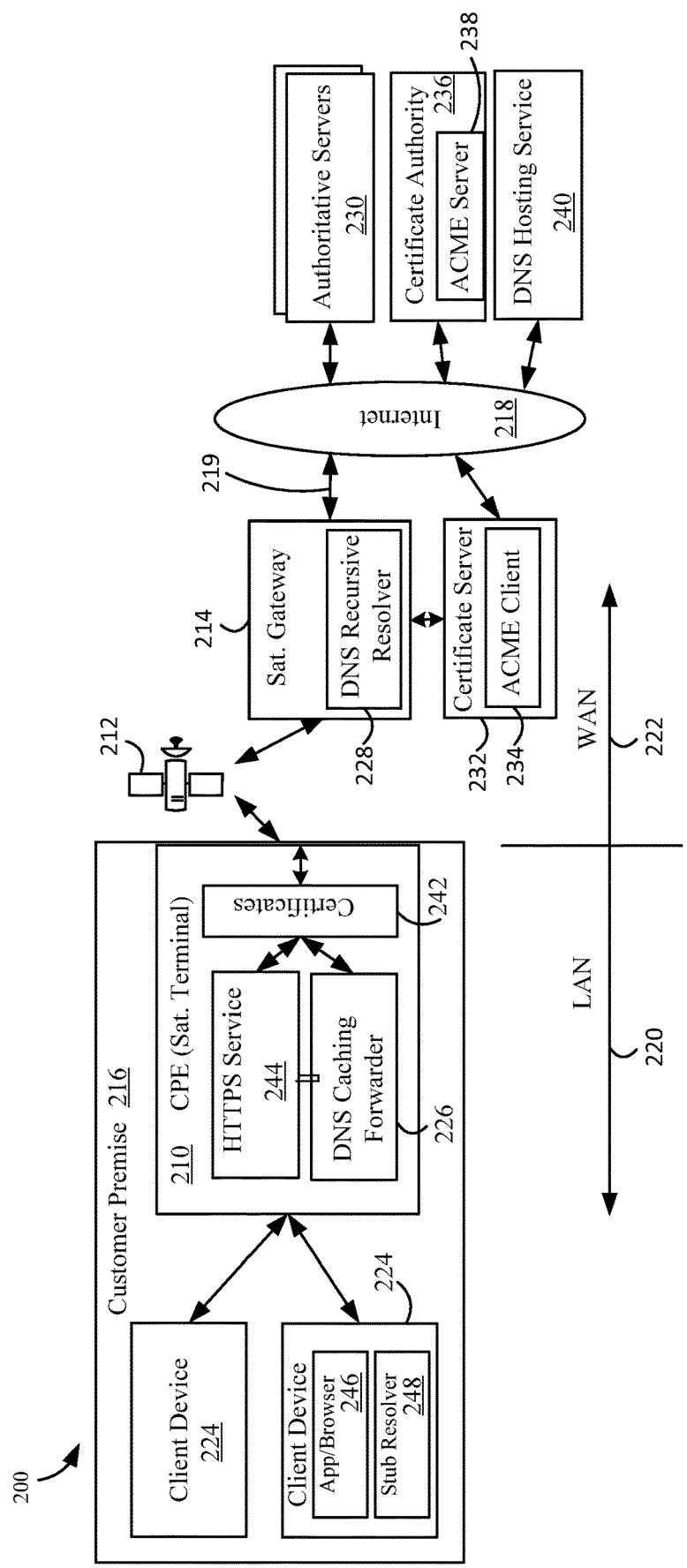
FIG. 2 illustrates an implementation of a satellite system configured to provision encrypted DNS and secure service with certificates at a CPE.

FIG. 2 illustrates an implementation of a satellite system 200 configured to provision encrypted DNS and secure service services at a CPE with a CA-signed certificate. The system 200 includes one CPE or CPE terminal 210. The example satellite system 200 shows one satellite 212, one satellite gateway 214 and one CPE 210 at a customer premise 216. The satellite gateway 214 and the CPE 210 communicate with each other through the satellite 212 using radio resources. The satellite gateway 214 may be connected to the Internet 218 with a backhaul link 219. The system 200 also may be connected to one or more authoritative servers 230 or sometimes called an authoritative name server that provides IP addresses for a domain name.

The satellite system 200 has a LAN 220 and WAN portion 222 like that described above with reference to FIG. 1. Further, the system 200 may include one or more client devices 224 which may include an application and browser 246 and a stub resolver 248. The client devices 224 reside at the LAN 220 interface side where private IP addresses are assigned to them by the CPE 210 or satellite terminal. One or more public IP addresses are assigned on the WAN 222 interface side of the CPE by an ISP (not shown) accessed through the internet 218 over the satellite 212. The CPE 210 performs NAT to map private IP addresses of client's devices in the LAN 220 interface side of the CPE to one or a few public IP addresses of the CPE in the WAN 222 interface side for communication between client devices in the LAN and Internet servers. The CPE 210 includes a DNS caching forwarder 226. The DNS caching forwarder 226 converts global FQDNs to public IP addresses, and in addition, also translates local hostnames/domain names/ FQDNs to local private IP address.

The satellite system 200 may include one or more certificate servers connected to the satellite gateway 214. A single certificate server 232 is shown in this example. The certificate server 232 has a global FQDN and public IP address. The certificate server 232 with an ACME client 234 obtains a certificate from a CA 236 with an ACME server 238 as described further below. The CA 236 issues a CA-signed certificate, renews the certificate when it expires, and revokes the certificate if the private key is compromised or if the certificate was issued in violation of specified rules. A DNS hosting service 240 manages DNS name servers that provide DNS services to translate the FQDN to the associated public IP addresses. The satellite gateway 214 broadcasts certificates obtained by the certificate server 232 to the CPE terminal 210. The CPE terminal stores the certificates 242. The CPE terminal 210 then uses the certificates 242 to set up encrypted HTTPS services 244 for the client devices 224 as described further herein.

ACME protocols can be used to automate obtaining a CA-signed certificate from a CA and certificate management without human intervention. For example, the ACME client 234 software can be installed in the certificate server 232 to request the certificate by communicating with the ACME server 238 at the CA 236. The ACME server 238 may offer different challenge types to the ACME client 234 to prove that the FQDN/domain name in the requested certificate is owned by the requestor. After the successful validation of the ownership of the FQDN, the ACME server 238 provides a certificate to the ACME client 234 which then installs the certificate in the certificate server 232. The ACME client 234 may also keep track of when the certificate is going to expire and automatically renew it. The ACME client 234 may also help revoke the certificate if it becomes necessary.

In some implementations, the system described herein may utilize a "wildcard" TLS certificate. A wildcard certificate is a CA-signed certificate that is typically used for multiple sub-domains of a domain. For example, a single wildcard certificate for https://*.example.com would secure all domains with the wildcard https://*.example.com domain, including the following subdomains: payment.example.com, contact.example.com, mail.example.com. As the wildcard certificate supports multiple subdomains, the wildcard certificate can be readily used in servers, which are different from the server with the ACME client where the certificate is originally installed. For example, "Termg1.Beam1.gw1.xyz" is obtained by the ACME client in the certificate server at the satellite gateway and the certificate can be installed in CPEs, CPE #1 to CPE #P, which are located in a satellite beam. The wildcard certificate, "*.Termg1.Beam1.gw1.xyz", applies to "cpe1.Termg1.Beam1.gw1.xyz", "cpep.Termg1.Beam1.gw1.xyz" and etc. Moreover, one wildcard certificate can be installed in one or more CPEs for more efficient operation and management especially when there are large number of CPEs which need to be installed with certificates. Thus, the wildcard certificate can be advantageously utilized in this way to use a single certificate for more than one or a group of CPEs in a single beam of a satellite.

Figure 3:
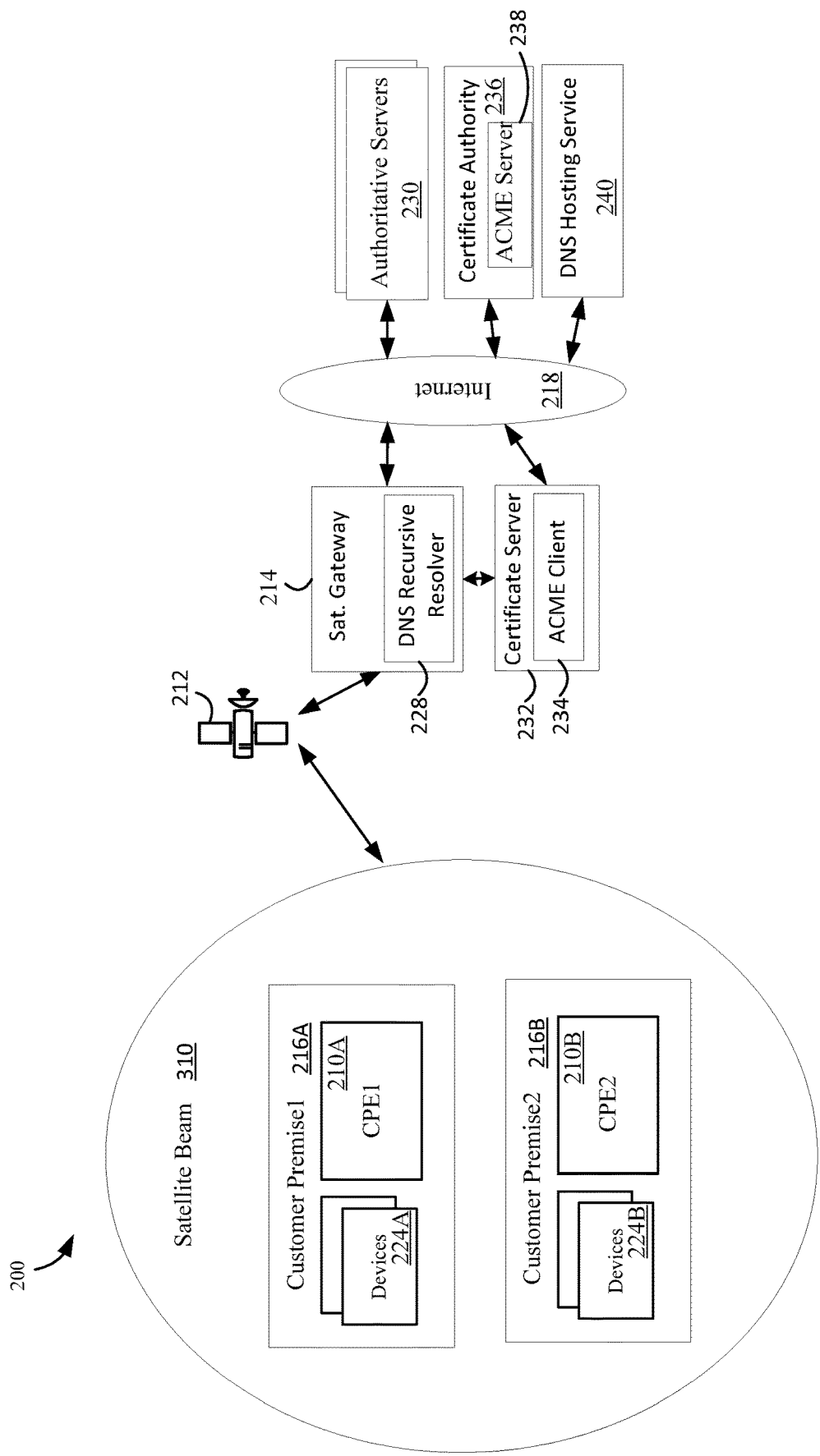
FIG. 3 illustrates an implementation of a satellite system configured to provision encrypted DNS and secure service with certificates at a number of CPEs located in one satellite beam in a satellite system.

FIG. 3 illustrates an implementation of a satellite system configured to provision encrypted DNS and secure service with certificates at a number of CPEs located in one satellite beam in a satellite system. The satellite system 200 described above typically has the ability to perform a broadcast transmission. The satellite system 200 may take advantage of this broadcast capability to make efficient use of the satellite bandwidth when distributing certificates. FIG. 3 illustrates another view of the satellite system 200 where a single satellite 212 has a satellite beam 310 that covers multiple satellite terminals or CPEs. In this example, the satellite beam 310 covers CPE1 210A and CPE2 210B, collectively referred to as CPEs 210. CPE1 210A resides at a customer premise1 216A and CPE2 210B resides at a second customer premise2 216B. Each of the CPEs 210 within a satellite beam can receive the same data stream transmitted by the satellite gateway 214 over the satellite 212. The satellite system 200 takes advantage of the ability of multiple CPEs 210 covered by a single satellite beam in combination with a wildcard certificate normally used to cover multiple domains to make efficient use of satellite bandwidth. The satellite system 200 uses this combination by sending a wildcard certificate to cover all CPEs in the satellite beam 310. Transmissions from the satellite gateway 214 are sent to the CPEs 210 to install, renew and revoke certificates. These transmissions for installation, renewal, and revocation of the certificate can each be performed in one broadcast transmission to the group of the terminals to make efficient use of satellite bandwidth. While FIG. 3 only shows two CPEs 210, an implementation could include any number of CPEs located in the same satellite beam and use the same wildcard certificate being broadcast to the CPEs in one transmission.

The CPEs 210 access the internet 218 through the satellite 212 and satellite gateway 214. As described above, one wildcard CA-signed certificate may be allocated to the CPEs 210 and managed by the certificate server 232. A number of client devices may be connected to the LAN interface of a CPE 210 for the internet access. In the illustrated example, CPE1 210A is connected to client devices 224A and CPE2 210B is connected to client devices 224B. Client devices 224A and 22B are collectively referred to as client devices 224 or client device 224. The client devices 224 are assigned private IP addresses by the CPE 210. Similar to the prior art, each client device 224 may include various applications (APPs) browsers 246 and a DNS stub resolver 248 as shown in FIG. 2. The DNS caching forwarder 226 serves as an intermediary between APPs and browsers, and the DNS recursive resolver 228 for DNS lookups.

As shown in FIG. 2, a DNS caching forwarder 226 may be hosted in the CPE 210. The DNS forwarder 226 provides classic unencrypted DNS. Using the TLS certificate from the certificate server 232 at the satellite gateway 214, the DNS caching forwarder 226 in the CPE 210 may provide encrypted DNS service to client devices 224 in the LAN. The CPE 210 advertises itself as the default DNS server to devices (i.e. client devices 224) in its LAN using Dynamic Host Configuration Protocol (DHCP) and/or IPv6 Router Advertisement (RA). Therefore, the devices in the LAN send DNS queries to the CPE 210 for the classic unencrypted DNS service. The DNS caching forwarder 226 in the CPE 210 provides DNS lookups for both global public FQDNs or domain names and local private FQDNs or domain names or host names. Global public FQDNs are associated with globally unique public IP addresses whereas local private FQDNs are mapped to local private IP addresses.

The satellite system 200 may also incorporate split horizon or local split DNS. Split horizon DNS is used where the same FQDN leads to different IP addresses depending on which DNS server in different LANs or in the Internet answers the query from a client. For example, where there are hosts with the same FQDN in LAN A, in LAN B and in the global Internet, if a client in LAN A and a client in LAN B issues a query for the FQDN then the CPE in LAN A and the CPE in LAN B answer the query with the private IP address in LAN A and the private IP address in LAN B respectively. If the query from a client in LAN A and a client in LAB B goes to a DNS sever on the Internet bypassing the CPEs in their LANs, the response to the query will be the public IP address of the FQDN to clients both in LAN A and in LAN B. Split-horizon or local split DNS allows for local client machines to access a server directly through the local network and the local server is protected from the Internet.

One or more secure web services can be hosted in the CPE using the same certificate and provisioning of service based on edge computing can be realized in a secure manner. The services are provided to the clients in the LAN by the CPE without requiring the communication to the Internet by making use of the DNS cache. The stub resolver in the client device communicates with DNS forwarder with encrypted DNS service at the CPE. If DNS forwarder at the CPE has the answer for the DNS query, the answer will be replied to the client device immediately. If not, the DNS forwarder at the CPE will go to the internet to obtain the answer and will provide it to the client device. The client device thus does not communicate to the internet by itself directly. Therefore, the response time and latency of the application can be significantly reduced, and the transmission bandwidth can be minimized.

As described above, implementations of the described system 200 may incorporate all or a combination of: ACME for automated free certificate acquisition and management, wildcard certificates for provisioning secure and encrypted services with multiple subdomains at different locations, split-horizon DNS for offering encrypted DNS services at private IP addresses, using one certificate for multiple CPEs, and suing the broadcast capability in a satellite system to efficiently provide certificates to the CPEs.

As shown in FIG. 3, a satellite gateway 214 (or gateway station) may communicate through a satellite with satellite terminals which are located in satellite beams. Forward link refers to a communication path from a gateway station to CPEs or terminals. Return link represents a path from a CPE to a gateway station. In the forward link, all the terminals within a satellite beam can receive the same data transmitted by a gateway. One broadcast of the content satisfies all the users within the broadcast coverage saving significant amount of transmission resource.

CPEs (satellite terminals) in a satellite beam are formed into terminal groups for efficient operation and management of certificates. Typically, there will be one certificate per one terminal group. Groups can be formed in various ways based on different criteria. For example, the groups can be formed based on geographical location, priority of secure web services, broadband subscription level or the type of terminal hardware. For geographical location of terminals, the terminals with similar level of received signal strength from the satellite can be grouped together. Higher order modulation and high coding rate can be used for terminals in the center of the beam for higher data rate while lower order modulation and lower coding rate is used for those in the edge of the beam which results in lower data rate. High data rate cannot be achieved for the broadcast transmission if terminals from at the center of the beam are mixed with those in the edge of the beam in a terminal group. For priority of web services, CPEs can be grouped together where secure services require higher security and certificates can be renewed with higher frequency. For broadband satellite subscription level, CPEs can be grouped taking into account the different service subscription types or level of service such as platinum, gold and bronze. For types of secure service, CPEs can be grouped by the type of satellite terminal hardware, where secure services can be provisioned depending on the capability of terminal hardware.

The number of satellite terminals in a terminal group can vary from one to thousands. A group with only one terminal is very secure since no other terminals are sharing the certificate, but it is extremely inefficient for certificate management. A terminal group with thousands of terminals allows for efficient certificate management but any security breach in one terminal can pose a harm to any other terminal in the group.

Figure 4:
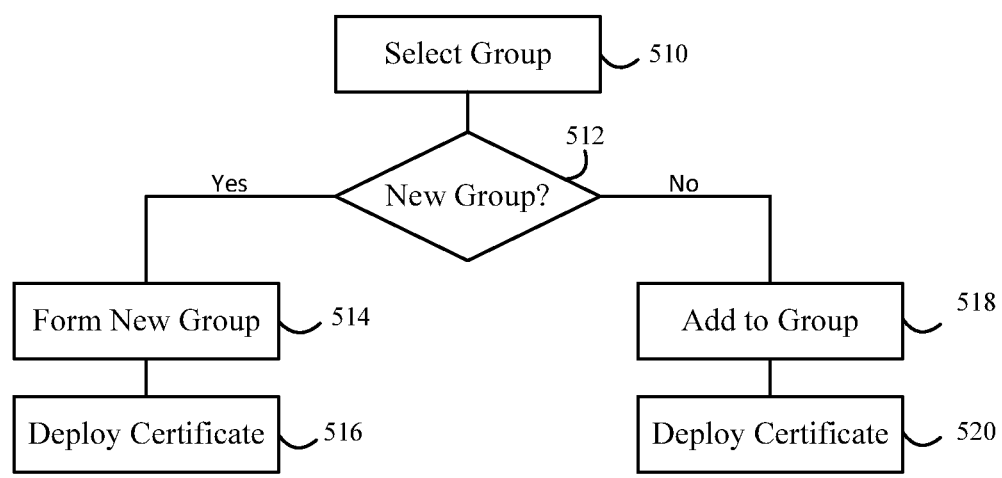
FIG. 4 illustrates an implementation of a satellite system configured for adding and moving terminals to/from a group.

FIG. 4 illustrates an example implementation of certificate management by a satellite gateway. Satellite terminal groups will change as changes are made in the satellite system. FIG. 4 shows an example implementation for adding and moving a terminal to and from a satellite terminal group. First, a group of satellite terminals are selected (step 510). Selection of the group 510 may be done according to the example criteria described above. If the selected group is a new group (step 512=yes) then a new group is formed (step 514) and the certificate is deployed (step 516). If the selected group is not a new group (step 512=no) then the satellite terminal is added to the group (step 518) and the certificate is deployed (step 520). After the satellite terminal is added to a group, an existing certificate can be unicast to the terminal if the group is an existing one. If the group is new, a new certificate can be requested and delivered to the satellite terminals in the group.

Figure 5:
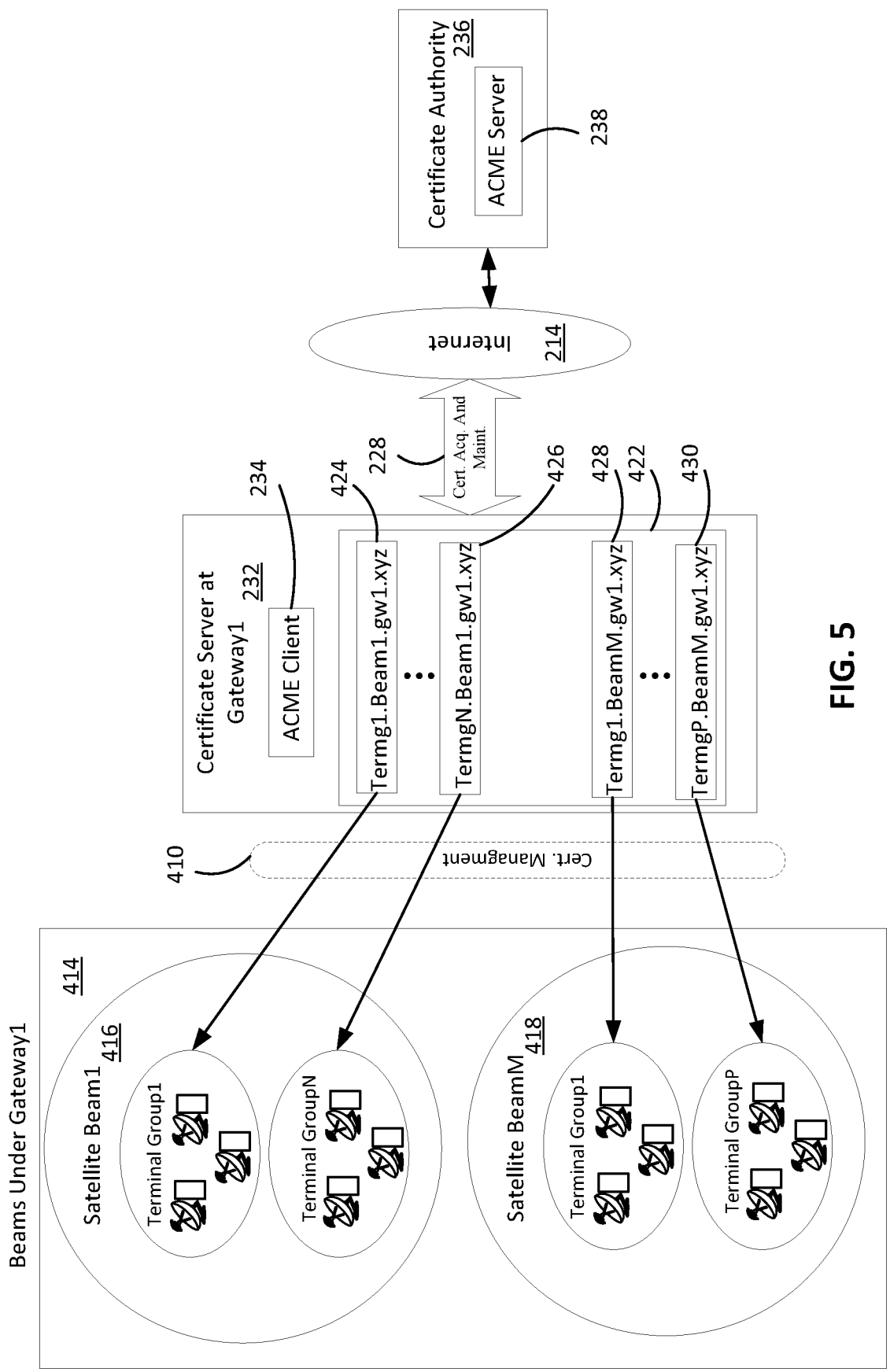
FIG. 5 illustrates an example implementation of certificate management by a satellite gateway.

FIG. 5 illustrates an implementation of a satellite system configured for adding and moving terminals to/from a group. FIG. 5 shows additional details of an implementation of the certificate server 232 introduced in FIG. 2. In this implementation, the certificate server 232 is located at a satellite gateway #1 (not shown) to provide certificate management 410. There are multiple beams 414 under gateway #1. In this example implementation, there are M satellite beams under the gateway #1 represented by satellite beam1 416 and satellite beamM 418, where M is an integer. There may be one or more terminal groups in a satellite beam. In this example, satellite beam1 416 has terminal groups 1 through N, and satellite beamM 418 has groups 1 through P, where N and P are also integers. The certificate server 232 has an ACME client 234 which communicates with an ACME server 238 in a certificate authority 236 using the ACME protocol for certificate acquisition and maintenance. The certificate server 232 also maintains a certificate repository 422 which stores the certificates for all the terminals associated with the gateway.

Each certificate stored in the certificate repository 422 of the certificate server 232 corresponds to one terminal group. For example, Wildcard certificate "Termg1.Beam1.gw1.xyz" 424 is for terminal group #1 in beam #1 in Gateway #1, certificate "TermgN.Beam1.gw1.xyz" 426 is for terminal group #N in beam #1 in Gateway #1. Similarly, "Termg1.BeamM.gw1.xyz" 428 is for terminal group #1 in beam #M in Gateway #1, certificate "TermgP.BeamM.gw1.xyz" 430 is for terminal group #P in beam #M in Gateway #1. As these are wildcard certificate, "Termg1.Beam1.gw1.xyz" is valid for all the FQDN with an address of: "*."Termg1.Beam1.gw1.xyz" where "*" can be any valid string for a subdomain under the IETF standard.

Either the same FQDN or different FQDNs can be used for encrypted DNS services and secure web services at different CPEs in a terminal group. For example, either the same FQDN, "cpe.Termg1.Beam1.gw1.xyz" or different FQDNs, "cpe1.Termg1.Beam1.gw1.xyz", "cpe2.Termg1.Beam1.gw1.xyz", . . . , "cpeQ.Termg1.Beam1.gw1.xyz", can be used for all the terminals in terminal group #1 in beam #1 in Gateway #1.

Certificate management includes the tasks of requesting, renewing and revoking certificates. A certificate request is made for a new certificate for a new terminal group. Existing certificates must be renewed where each certificate typically has an expiration date which ranges from days to a couple of months. One leading CA recommends renewal of certificates every 60 days while its certificates expire in 90 days. Revoking an existing certificate may be done in cases of security breach or retirement of the certificate. ACME protocol has no notion of renewal. Instead, a client "renews"

a certificate by simply requesting a new certificate. Frequency of certificate renewal can be different for different terminal groups.

Figure 6:
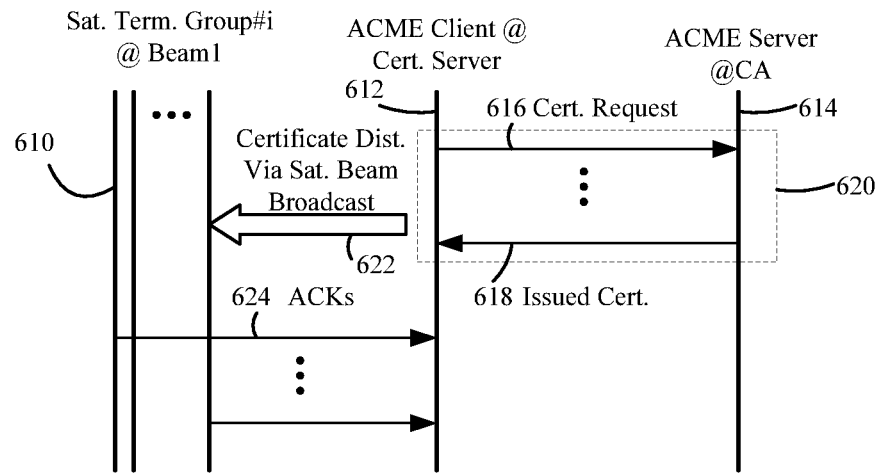
FIG. 6 illustrates an example of certificate request and broadcast distribution of issued certificates to a Satellite terminal group.

As described above with reference to FIGS. 3 and 5, there may be one or more certificate servers 232 associated with a satellite gateway. An ACME client 234 located in a certificate server 232 performs ACME protocol with an ACME server 238 in a certificate authority 236 for certificate management. FIG. 6 illustrates an example of message flow between the ACME client 612, the ACME server 614 and the satellite terminals 610 to perform a certificate request procedure. The ACME client 612 executes an ACME certificate request procedure 616 with the ACME server 614 and receives an issued certificate 618 and its associated key material. The certificate request 616 and issued certificates 618 may be repeated 620 as shown. The satellite gateway (not shown in FIG. 6) broadcasts 622 the certificate and its key material to terminals in the corresponding terminal group 610 and the terminals confirm the successful reception of the certificate with acknowledgement 624 in the satellite return channel.

Figure 7:
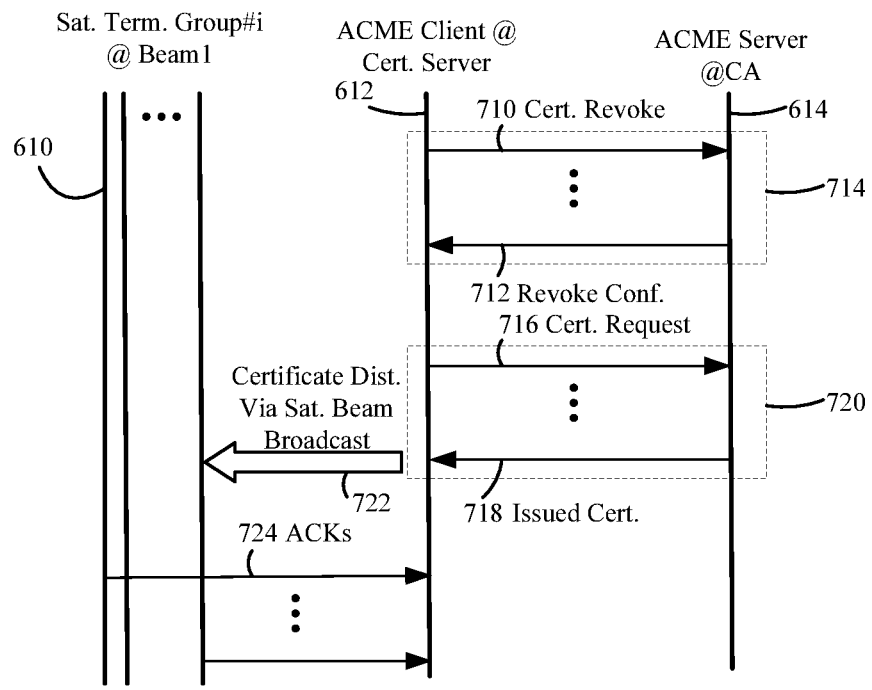
FIG. 7 illustrates an example of revoking a certificate, requesting a new certificate and broadcast distribution of issued certificates to a satellite terminal group.

FIG. 7 illustrates an example of message flow between the ACME client 612, the ACME server 614 and the satellite terminals 610 to perform a certificate revocation procedure with the ACME server 614. The ACME client 612 executes an ACME certificate revoke procedure 710 with the ACME server 614 and receives in return a revoke confirmation 712. The certificate revoke request 710 and confirmation 712 may be repeated 714 as shown. If there are still terminals existing in the terminal group with this revoked certificate, the ACME client requests a new certificate and distributes the certificate and keys to terminals in the terminal group via satellite broadcast as follows. The ACME client 612 then executes an ACME certificate request procedure 716 with the ACME server 614 and receives an issued certificate 718 and its associated key material. The certificate request 716 and issued certificates 718 may be repeated 720 as shown. The satellite gateway broadcasts 722 the certificate and its key material to terminals in the corresponding terminal group 610 and the terminals confirm the successful reception of the certificate with acknowledgement 724 in the satellite return channel.

Figures 8, 9:
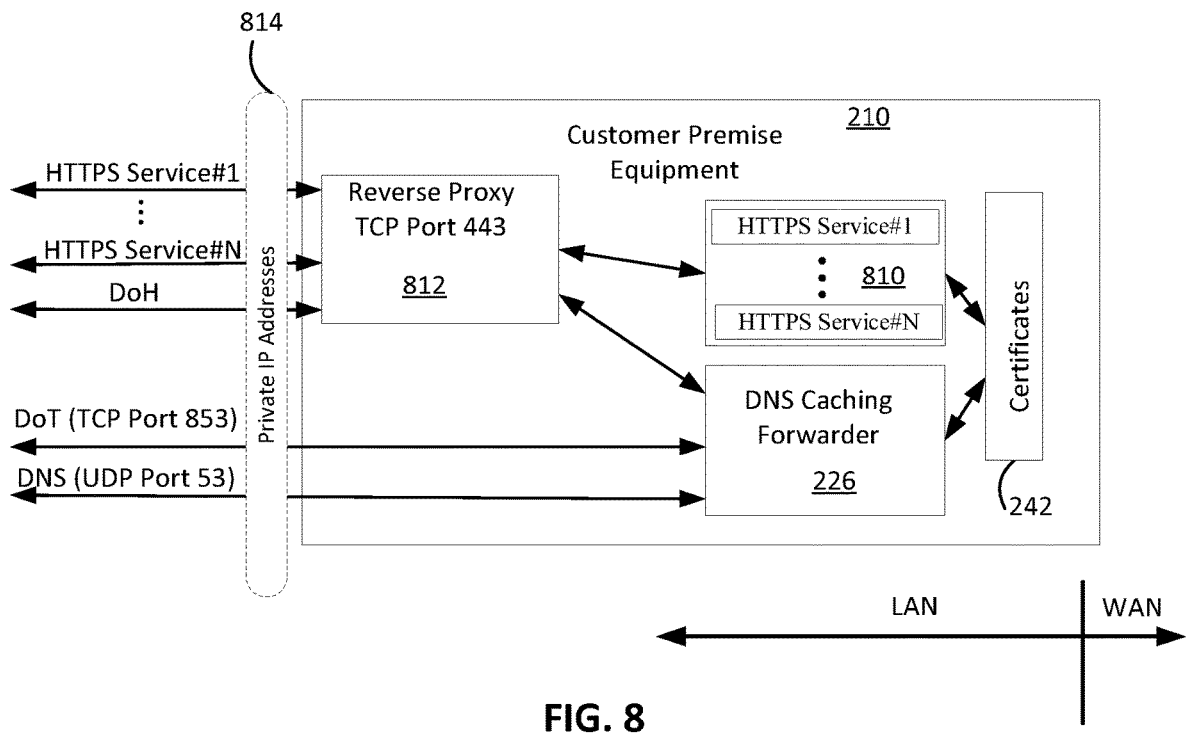
FIG. 8 illustrates an example of a CPE configured to provision encrypted DNS and secure services.
FIG. 9 illustrates an example of a local DNS table for provisioning encrypted DNS and secure service at a CPE.

FIG. 8 illustrates an example of a CPE 210 configured to provision encrypted DNS and secure web services. CPE system 210 receives certificates 242, including wildcard certificates, and their associated key material from the certificate server via the satellite gateway as described above. The DNS caching forwarder 226 may use classic unencrypted DNS and encrypted DNS services. Thus, in addition to the usual unencrypted DNS service, the DNS forwarder 226 may provide encrypted DNS services using a TLS certificate as described above. Examples of encrypted DNS services 810 include DNS over HTTPS (DoH), DNS over TLS (DoT) and DNS over Quic (DoQ). The CPE system 210 may also provide one or more secure web services. Various forms of value-added web services can be offered with TLS security protection from the CPE using the certificates 242. Secure web services (HTTPS) and DoH make use of the Reverse Proxy TCP port 443 812 at the CPE 210. Demultiplexing software may be used to route the packets arriving at the reverse proxy TCP port 443 812 to different hypertext transfer secure protocol (HTTPS) services (HTTPS Service #1 through #N) and DoH appropriately with private IP addresses 814. The software to demultiplex and route packets is commonly known as "HTTP/HTTPS reverse proxy".

FIG. 9 illustrates an example of a local DNS table 910 used by the DNS caching forwarder 226 (FIG. 8) at the CPE 210. Encrypted DNS service and secure web services are hosted at the private IP address 814 of the CPE. When a client's device asks for DNS lookup of the FQDN for these services, it is required that the queries for the FQDNs are answered by the CPE and answered with the private IP address of the CPE. The FQDNs of the services are configured with private IP address of the CPE in the local DNS table 910. There are two columns in the example DNS table 910. The first column is FQDN of the services and hostname of the CPE and the second column is the private IP address of the CPE for the entity in the first column.

It is typically required for the CPE to advertise its offering of encrypted DNS services to client devices in the LAN. The discovery protocols for encrypted DNS service are being developed and standardized in the industry. The CPE can be configured with all the discovery protocols which are available as well as are going to be implemented by client devices in the future.

Figure 10:
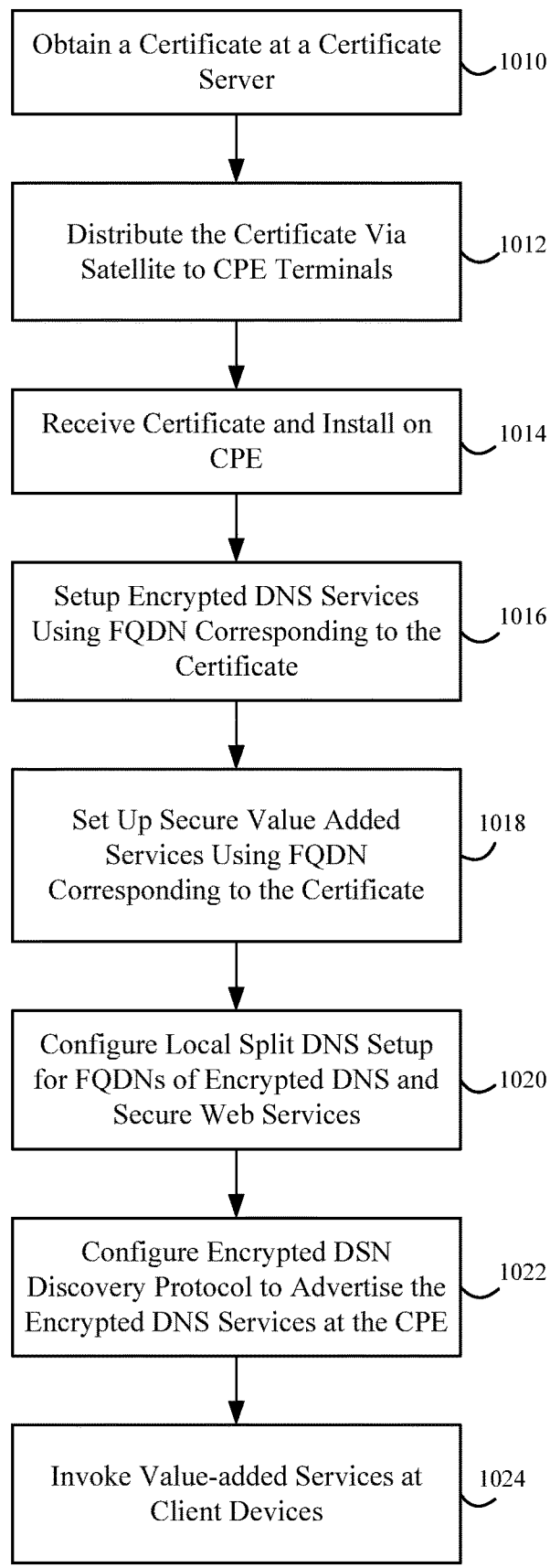
FIG. 10 shows an example method for provisioning workflow for secure DNS services at a CPE.

FIG. 10 shows an example method flow for provisioning secure DNS services at a CPE as described herein. First, obtain a certificate at a certificate server (step 1010). The certificate server may be located at and connected to a gateway of a satellite system. The certificate server may include an ACME client the communicates with an ACME server at a certificate authority. Next, distribute the certificate via satellite to at least one CPE terminal (step 1012). The certificate may be distributed to a number of CPEs located in one or more groups as described above. Then, receive the certificate at the CPE(s) and its key material and install them in a secure place in the CPE (step 1014). The certificates may include a wild card certificate such that the certificate is used for the CPEs in each terminal group as described above. Set up new encrypted DNS services using proper FQDN corresponding to the certificate (step 1016). The encrypted DSN services may be set up through a reverse proxy TCP port as described above and illustrated in FIG. 8. Set up secure value-added services using proper FQDN corresponding to the certificate (step 1018). The value-added services can be set up using the corresponding certificates. Configure local split-DNS setup for FQDNs of encrypted DNS and secure web services (step 1020). Local split-DNS services can be set up as described above. Configure encrypted DNS discovery protocol to advertise the encrypted DNS services at the CPE (step 1022). Invoke value-added services at the client devices (step 1024). Invoking the value-added services may include advertising the value-added services to a customer and the client's devices via standard protocol as well as out-of-band techniques.

Figure 11:
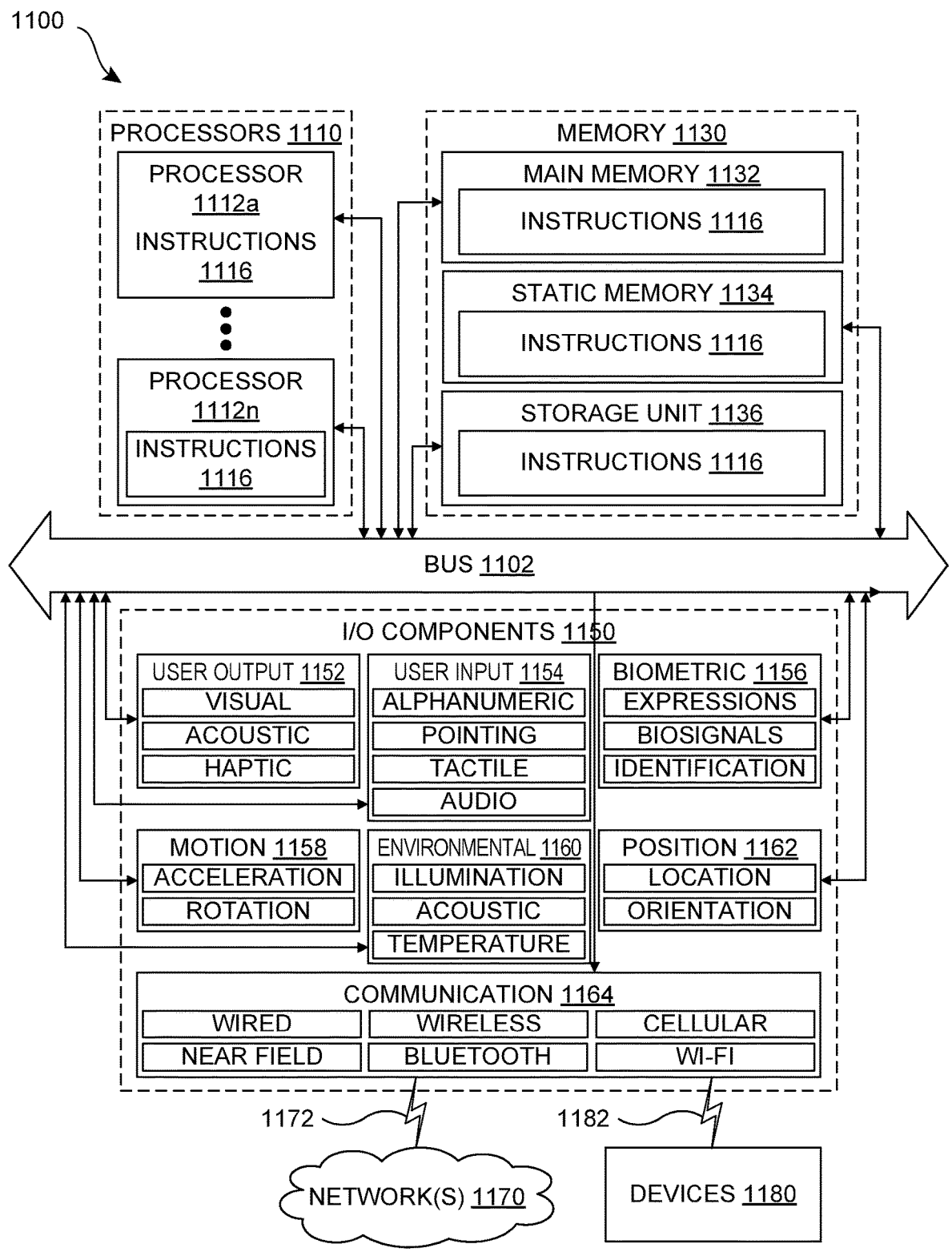
FIG. 11 is a block diagram showing an example software architecture, various portions of which may be used in conjunction with various hardware architectures herein described, which may implement any of the features described herein.

FIG. 11 is a block diagram illustrating components of an example machine 1100 configured to read instructions from a machine-readable medium (for example, a machine-readable storage medium) and perform any of the features described herein. The example machine 1100 is in a form of a computer system, within which instructions 1116 (for example, in the form of software components) for causing the machine 1100 to perform any of the features described herein may be executed. As such, the instructions 1116 may be used to implement modules or components described herein. The instructions 1116 cause unprogrammed and/or unconfigured machine 1100 to operate as a particular machine configured to carry out the described features. The machine 1100 may be configured to operate as a standalone device or may be coupled (for example, networked) to other machines. In a networked deployment, the machine 1100 may operate in the capacity of a server machine or a client machine in a server-client network environment, or as a node in a peer-to-peer or distributed network environment. Machine 1100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1100 is illustrated, the term "machine" includes a collection of machines that individually or jointly execute the instructions 1116.

The machine 1100 may include processors 1110, memory 1130, and I/O components 1150, which may be communicatively coupled via, for example, a bus 1102. The bus 1102 may include multiple buses coupling various elements of machine 1100 via various bus technologies and protocols. In an example, the processors 1110 (including, for example, a central processing unit (CPU), a graphics processing unit (GPU), a digital signal processor (DSP), an ASIC, or a suitable combination thereof) may include one or more processors 1112a to 1112n that may execute the instructions 1116 and process data. In some examples, one or more processors 1110 may execute instructions provided or identified by one or more other processors 1110. The term "processor" includes a multi-core processor including cores that may execute instructions contemporaneously. Although FIG. 15 shows multiple processors, the machine 1100 may include a single processor with a single core, a single processor with multiple cores (for example, a multi-core processor), multiple processors each with a single core, multiple processors each with multiple cores, or any combination thereof. In some examples, the machine 1100 may include multiple processors distributed among multiple machines.

The memory/storage 1130 may include a main memory 1132, a static memory 1134, or other memory, and a storage unit 1136, both accessible to the processors 1110 such as via the bus 1102. The storage unit 1136 and memory 1132, 1134 store instructions 1116 embodying any one or more of the functions described herein. The memory/storage 1130 may also store temporary, intermediate, and/or long-term data for processors 1110. The instructions 1116 may also reside, completely or partially, within the memory 1132, 1134, within the storage unit 1136, within at least one of the processors 1110 (for example, within a command buffer or cache memory), within memory at least one of I/O components 1150, or any suitable combination thereof, during execution thereof. Accordingly, the memory 1132, 1134, the storage unit 1136, memory in processors 1110, and memory in I/O components 1150 are examples of machine-readable media.

As used herein, "machine-readable medium" refers to a device able to temporarily or permanently store instructions and data that cause machine 1100 to operate in a specific fashion, and may include, but is not limited to, random-access memory (RAM), read-only memory (ROM), buffer memory, flash memory, optical storage media, magnetic storage media and devices, cache memory, network-accessible or cloud storage, other types of storage and/or any suitable combination thereof. The term "machine-readable medium" applies to a single medium, or combination of multiple media, used to store instructions (for example, instructions 1116) for execution by a machine 1500 such that the instructions, when executed by one or more processors 1110 of the machine 1100, cause the machine 1100 to perform and one or more of the features described herein. Accordingly, a "machine-readable medium" may refer to a single storage device, as well as "cloud-based" storage systems or storage networks that include multiple storage apparatus or devices. The term "machine-readable medium" excludes signals per se.

The I/O components 1150 may include a wide variety of hardware components adapted to receive input, provide output, produce output, transmit information, exchange information, capture measurements, and so on. The specific I/O components 1150 included in a particular machine will depend on the type and/or function of the machine. For example, mobile devices such as mobile phones may include a touch input device, whereas a headless server or IoT device may not include such a touch input device. The particular examples of I/O components illustrated in FIG. 11 are in no way limiting, and other types of components may be included in machine 1100. The grouping of I/O components 1150 are merely for simplifying this discussion, and the grouping is in no way limiting. In various examples, the I/O components 1150 may include user output components 1152 and user input components 1154. User output components 1152 may include, for example, display components for displaying information (for example, a liquid crystal display (LCD) or a projector), acoustic components (for example, speakers), haptic components (for example, a vibratory motor or force-feedback device), and/or other signal generators. User input components 1154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1150 may include biometric components 1156, motion components 1158, environmental components 1160, and/or position components 1162, among a wide array of other physical sensor components. The biometric components 1156 may include, for example, components to detect body expressions (for example, facial expressions, vocal expressions, hand or body gestures, or eye tracking), measure biosignals (for example, heart rate or brain waves), and identify a person (for example, via voice-, retina-, fingerprint-, and/or facial-based identification). The motion components 1158 may include, for example, acceleration sensors (for example, an accelerometer) and rotation sensors (for example, a gyroscope). The environmental components 1160 may include, for example, illumination sensors, temperature sensors, humidity sensors, pressure sensors (for example, a barometer), acoustic sensors (for example, a microphone used to detect ambient noise), proximity sensors (for example, infrared sensing of nearby objects), and/or other components that may provide indications, measurements, or signals corresponding to a surrounding physical environment. The position components 1162 may include, for example, location sensors (for example, a Global Position System (GPS) receiver), altitude sensors (for example, an air pressure sensor from which altitude may be derived), and/or orientation sensors (for example, magnetometers).

The I/O components 1150 may include communication components 1164, implementing a wide variety of technologies operable to couple the machine 1100 to network(s) 1170 and/or device(s) 1180 via respective communicative couplings 1172 and 1182. The communication components 1164 may include one or more network interface components or other suitable devices to interface with the network(s) 1170. The communication components 1164 may include, for example, components adapted to provide wired communication, wireless communication, cellular communication, Near Field Communication (NFC), Bluetooth communication, Wi-Fi, and/or communication via other modalities. The device(s) 1180 may include other machines or various peripheral devices (for example, coupled via USB).

In some examples, the communication components 1164 may detect identifiers or include components adapted to detect identifiers. For example, the communication components 1164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1162, such as, but not limited to, geo-location via Internet Protocol (IP) address, location via Wi-Fi, cellular, NFC, Bluetooth, or other wireless station identification and/or signal triangulation.

Figure 12:
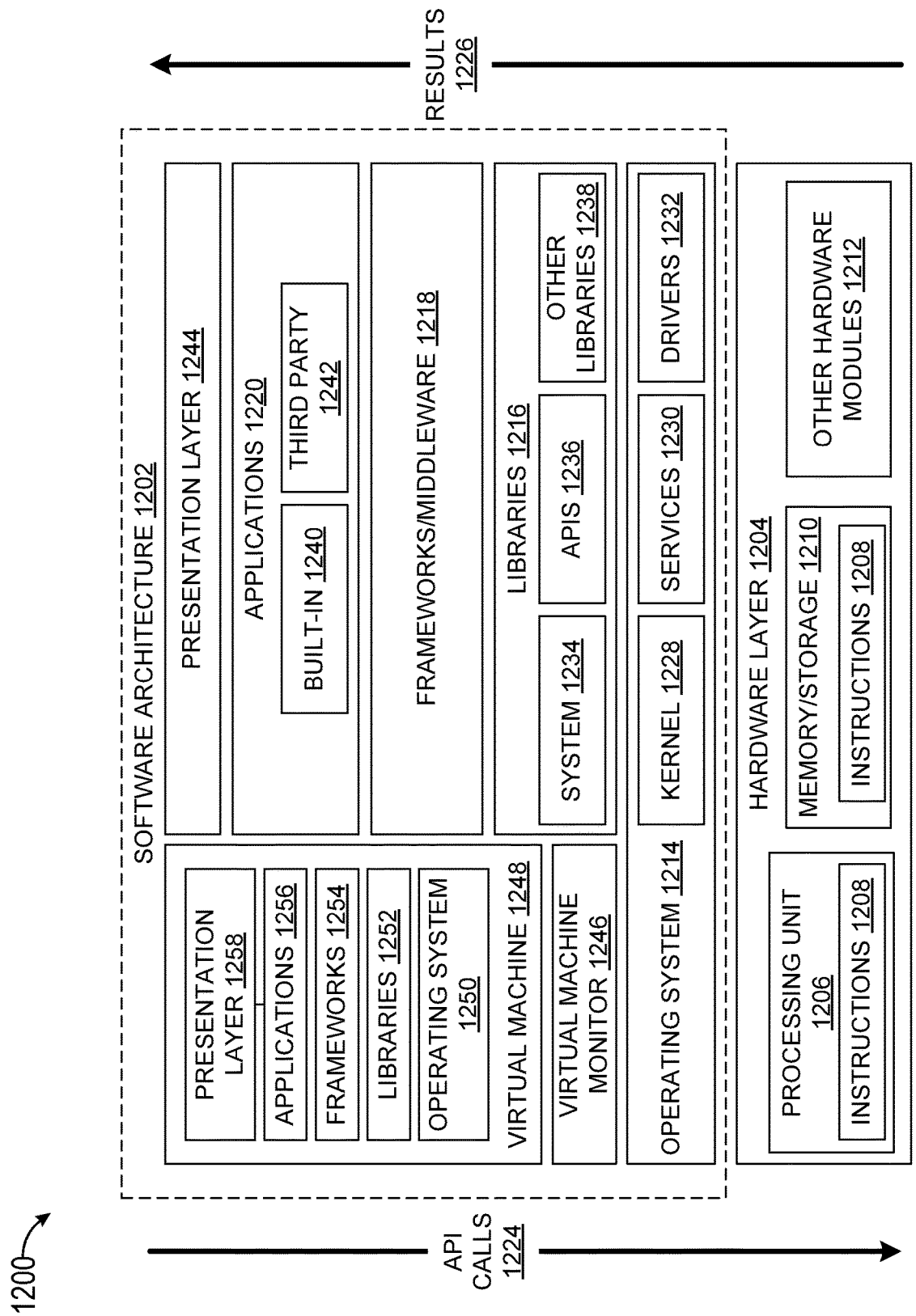
FIG. 12 is a block diagram showing components of an example machine configured to read instructions from a machine-readable medium and perform any of the features described herein.

FIG. 12 is a block diagram 1200 illustrating an example software architecture 1202, various portions of which may be used in conjunction with various hardware architectures herein described, which may implement any of the above-described features. FIG. 12 is a non-limiting example of a software architecture and it will be appreciated that many other architectures may be implemented to facilitate the functionality described herein. The software architecture 1202 may execute on hardware such as a machine 1100 of FIG. 11 that includes, among other things, processors 1110, memory 1130, and input/output (I/O) components 1150. A representative hardware layer 1204 is illustrated and can represent, for example, the machine 1100 of FIG. 11. The representative hardware layer 12004 includes a processing unit 1206 and associated executable instructions 1208. The executable instructions 1208 represent executable instructions of the software architecture 1202, including implementation of the methods, modules and so forth described herein. The hardware layer 1204 also includes a memory/storage 1210, which also includes the executable instructions 1208 and accompanying data. The hardware layer 1204 may also include other hardware modules 1212. Instructions 1208 held by processing unit 1208 may be portions of instructions 1208 held by the memory/storage 1210.

The example software architecture 1202 may be conceptualized as layers, each providing various functionality. For example, the software architecture 1202 may include layers and components such as an operating system (OS) 1214, libraries 1216, frameworks 1218, applications 1220, and a presentation layer 1244. Operationally, the applications 1220 and/or other components within the layers may invoke API calls 1224 to other layers and receive corresponding results 1226. The layers illustrated are representative in nature and other software architectures may include additional or different layers. For example, some mobile or special purpose operating systems may not provide the frameworks/middleware 1218.

The OS 1214 may manage hardware resources and provide common services. The OS 1214 may include, for example, a kernel 1228, services 1230, and drivers 1232. The kernel 1228 may act as an abstraction layer between the hardware layer 1204 and other software layers. For example, the kernel 1228 may be responsible for memory management, processor management (for example, scheduling), component management, networking, security settings, and so on. The services 1230 may provide other common services for the other software layers. The drivers 1232 may be responsible for controlling or interfacing with the underlying hardware layer 1204. For instance, the drivers 1232 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1216 may provide a common infrastructure that may be used by the applications 1220 and/or other components and/or layers. The libraries 1216 typically provide functionality for use by other software modules to perform tasks, rather than rather than interacting directly with the OS 1214. The libraries 1216 may include system libraries 1234 (for example, C standard library) that may provide functions such as memory allocation, string manipulation, file operations. In addition, the libraries 1216 may include API libraries 1236 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1016 may also include a wide variety of other libraries 1238 to provide many functions for applications 1220 and other software modules.

The frameworks 1218 (also sometimes referred to as middleware) provide a higher-level common infrastructure that may be used by the applications 1220 and/or other software modules. For example, the frameworks 1218 may provide various graphic user interface (GUI) functions, high-level resource management, or high-level location services. The frameworks 1218 may provide a broad spectrum of other APIs for applications 1220 and/or other software modules.

The applications 1220 include built-in applications 1240 and/or third-party applications 1242. Examples of built-in applications 1240 may include, but are not limited to, a contacts application, a browser application, a location application, a media application, a messaging application, and/or a game application. Third-party applications 1242 may include any applications developed by an entity other than the vendor of the particular platform. The applications 1220 may use functions available via OS 1214, libraries 1216, frameworks 1218, and presentation layer 1244 to create user interfaces to interact with users.

Some software architectures use virtual machines, as illustrated by a virtual machine 1248. The virtual machine 1248 provides an execution environment where applications/modules can execute as if they were executing on a hardware machine (such as the machine 1100 of FIG. 11, for example). The virtual machine 1248 may be hosted by a host OS (for example, OS 1214) or hypervisor, and may have a virtual machine monitor 1246 which manages operation of the virtual machine 1248 and interoperation with the host operating system. A software architecture, which may be different from software architecture 1202 outside of the virtual machine, executes within the virtual machine 1248 such as an OS 1214, libraries 1272, frameworks 1254, applications 1256, and/or a presentation layer 1258.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A customer premise equipment (CPE) terminal comprising:
   a processor with a memory, where the memory stores instructions that when executed cause the processor to:
   provide internet services to a client device at a customer premise through a satellite connected to a satellite gateway by:
      receiving a signed certificate from a certificate server connected to the satellite gateway,
      assigning a private internet protocol (IP) address to the client device in a local area network,
   and
      providing encrypted domain name server (DNS) services to the client device using the signed certificate and the private IP address.

2. The CPE terminal of claim 1, wherein the instructions further cause the processor to communicate with an application, browser and a DNS resolver in the client device.

3. The CPE terminal of claim 1, wherein the instructions further cause the processor to provide additional web services protected by Transport Layer Security (TLS) security using the signed certificate.

4. The CPE terminal of claim 1, wherein the instructions further cause the processor to provide local split-DNS for encrypted fully qualified domain names.

5. The CPE terminal of claim 1, wherein the encrypted DNS services are provided to the client device located at the customer premise without requiring the client device to communicate over an internet.

6. The CPE terminal of claim 1, wherein the signed certificate is a transport layer security (TLS) certificate received from a certificate authority (CA).

7. The CPE terminal of claim 1, wherein the instructions further cause the processor to use split-horizon DNS for providing the encrypted DNS services.

8. The CPE terminal of claim 1, wherein the signed certificate is a single certificate used for a plurality of CPEs.

9. The CPE terminal of claim 8, wherein the single certificate is a wild-card certificate that provisions secure and encrypted services with multiple CPEs within a CPE group.

10. A customer premise equipment (CPE) terminal comprising:
    a processor with a memory, where the memory stores instructions that when executed cause the processor to:
    provide internet services to a plurality of client devices at a customer premise through a satellite connected to a satellite gateway by:
       receiving a Certificate Authority (CA) signed wildcard Transport Layer Security (TLS) certificate from a certificate server connected to the satellite gateway,
       assigning a private internet protocol (IP) address to the plurality of client devices in a local area network,
       and providing encrypted domain name server (DNS) services to the plurality of client devices using the CA signed wildcard TLS certificate and the private IP address.

11. The CPE terminal of claim 10, wherein the instructions further cause the processor to provide additional web services protected by TLS security using the signed wildcard certificate.

12. The CPE terminal of claim 10, wherein the instructions further cause the processor to provide local split-DNS for encrypted fully qualified domain names.

13. The CPE terminal of claim 10, wherein the encrypted DNS services are provided to a client device of the plurality of client devices located at the customer premise without requiring the client device to communicate over an internet.

14. A customer premise equipment (CPE) terminal comprising:
  a processor with a memory, where the memory stores instructions that when executed cause the processor to:
  provide internet services to a client device and provisioning workflow at the CPE through a satellite connected to a satellite gateway by:
    receiving a signed certificate from a certificate server connected to the satellite gateway and installing the signed certificate at a secure place in the CPE, wherein the signed certificate is a wild-card certificate that provisions secure and encrypted services with multiple CPEs within a CPE group,
    assigning a private internet protocol (IP) address to the client device in a local area network,
    and
    providing encrypted domain name server (DNS) services to the client device using the signed certificate and the private IP address.

15. The CPE terminal of claim 14, wherein the instructions further cause the processor to communicate with an application, browser and a DNS resolver in the client device.

16. The CPE terminal of claim 14, wherein the instructions further cause the processor to provide additional web services protected by Transport Layer Security (TLS) security using the signed certificate.

17. The CPE terminal of claim 14, wherein the instructions further cause the processor to provide local split-DNS for encrypted fully qualified domain names.

18. The CPE terminal of claim 14, wherein the encrypted DNS services are provided to the client device located at a customer premise without requiring the client device to communicate over an internet.

19. The CPE terminal of claim 14, wherein the signed certificate is a transport layer security (TLS) certificate received from a certificate authority (CA).

20. The CPE terminal of claim 14, wherein the instructions further cause the processor to use split-horizon DNS for providing the encrypted DNS services.

* * * * *